Patented Dec. 17, 1940

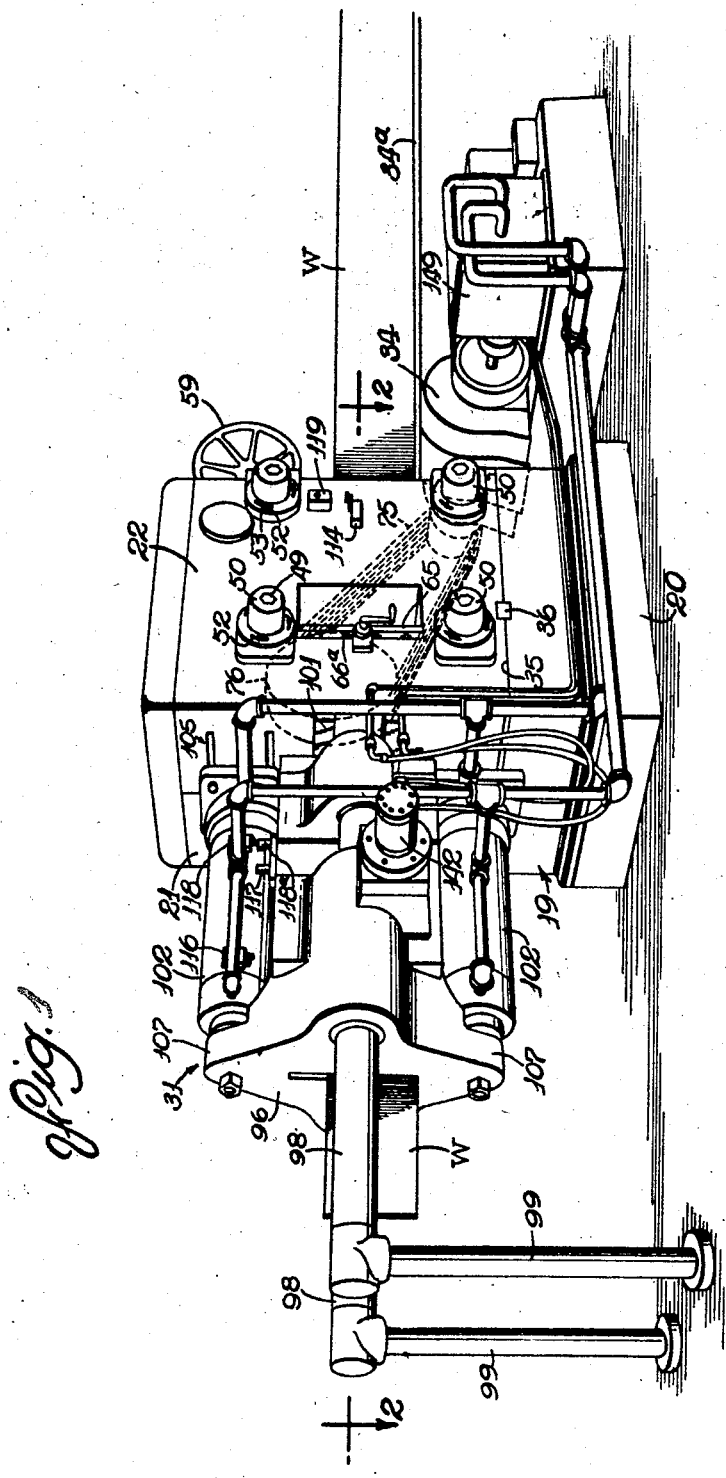

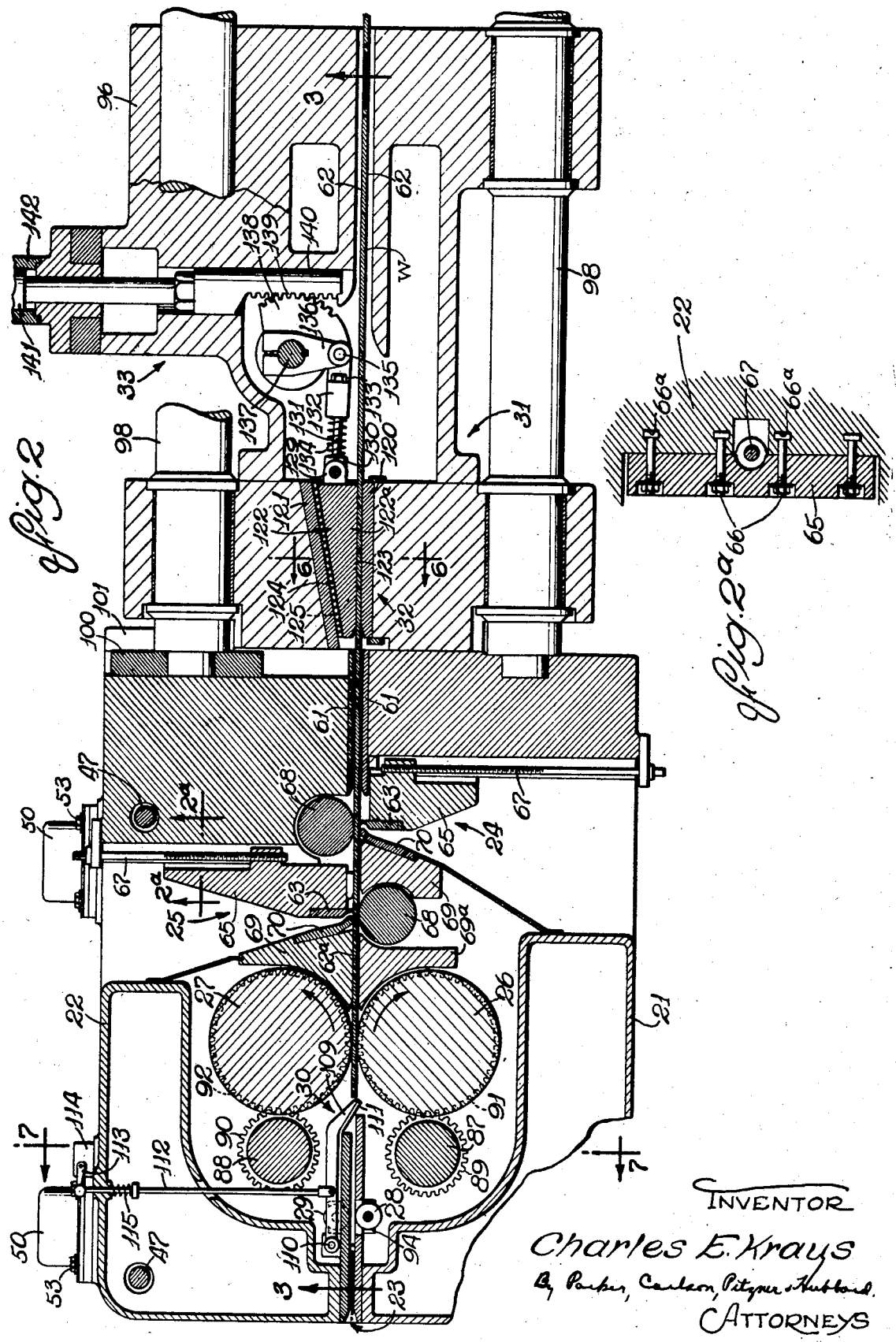

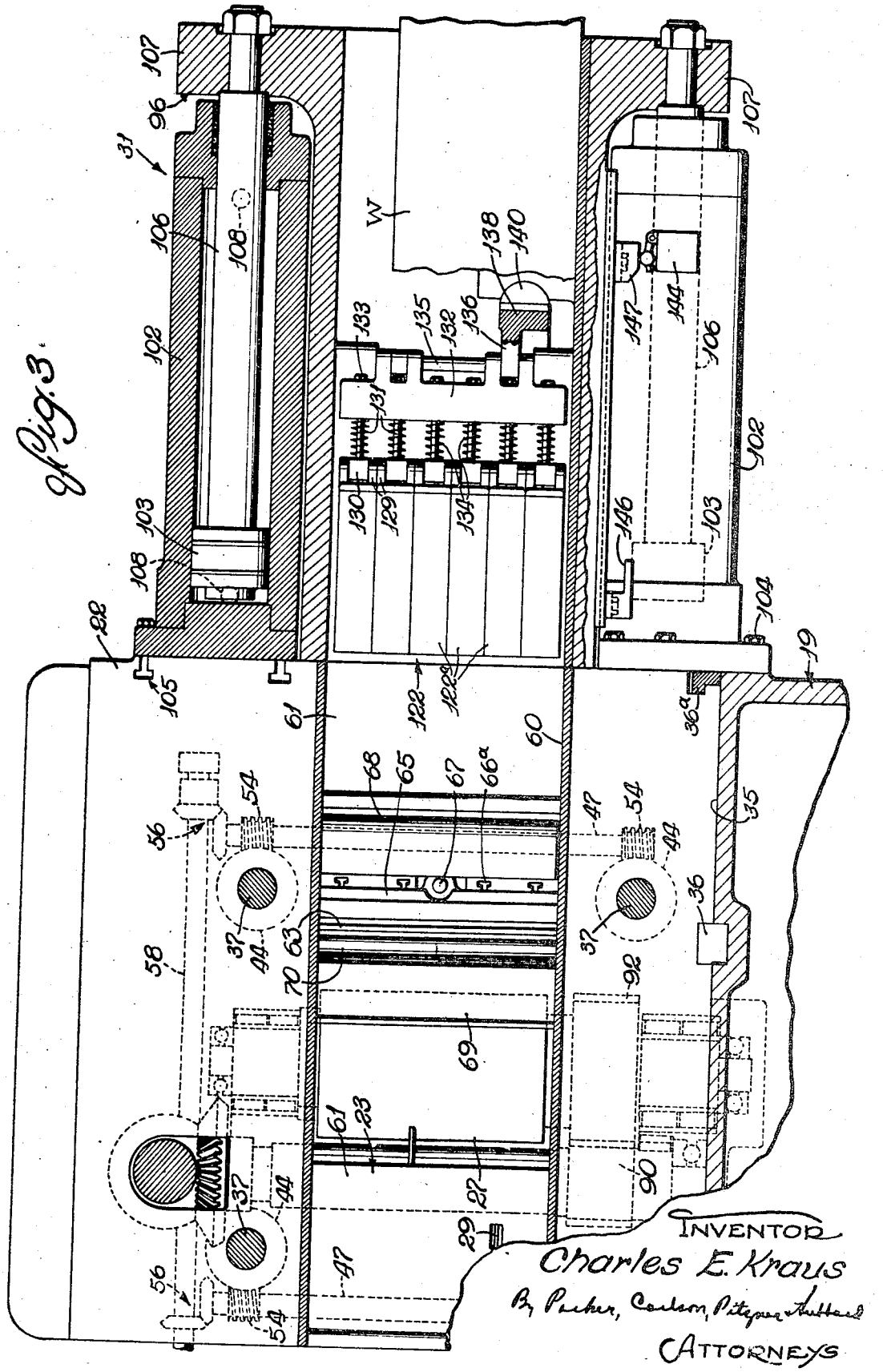

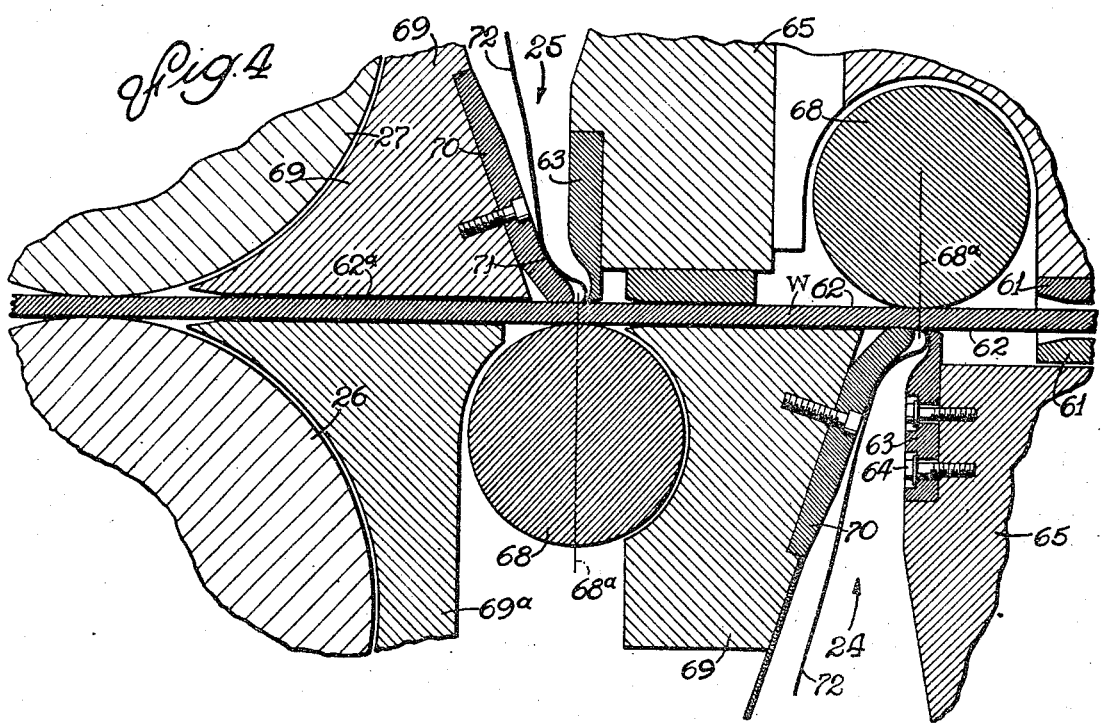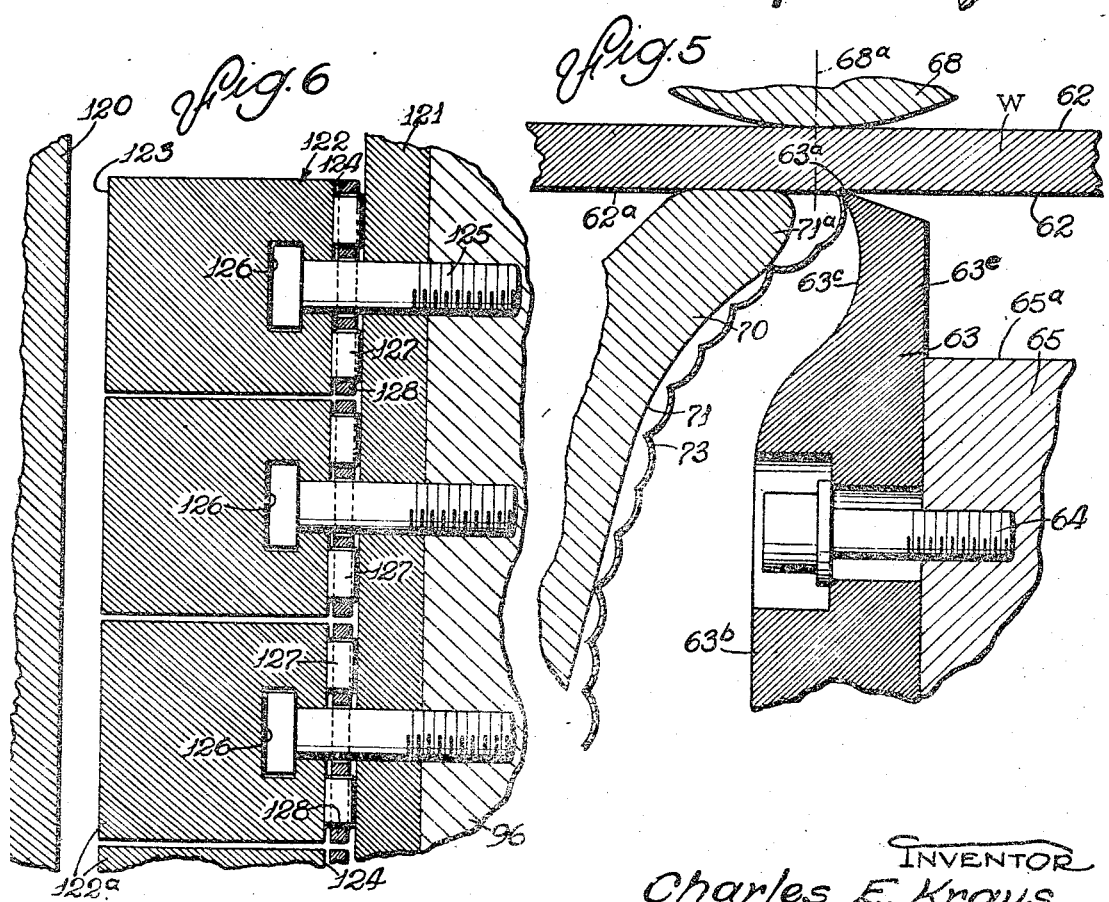

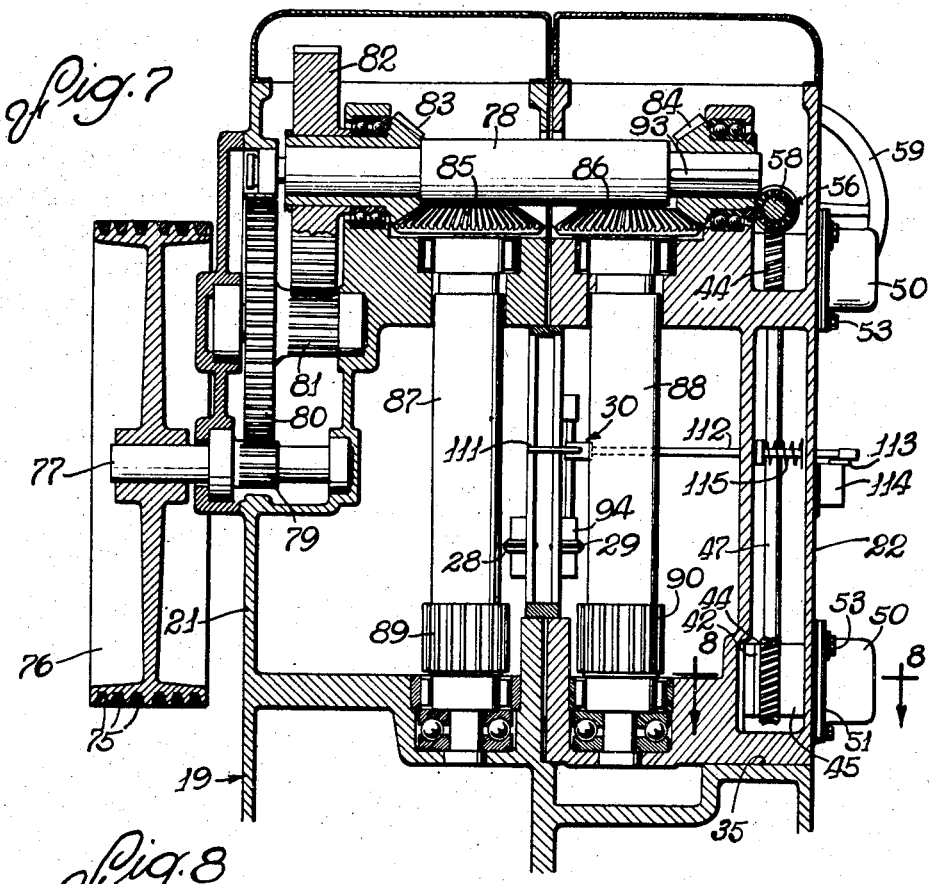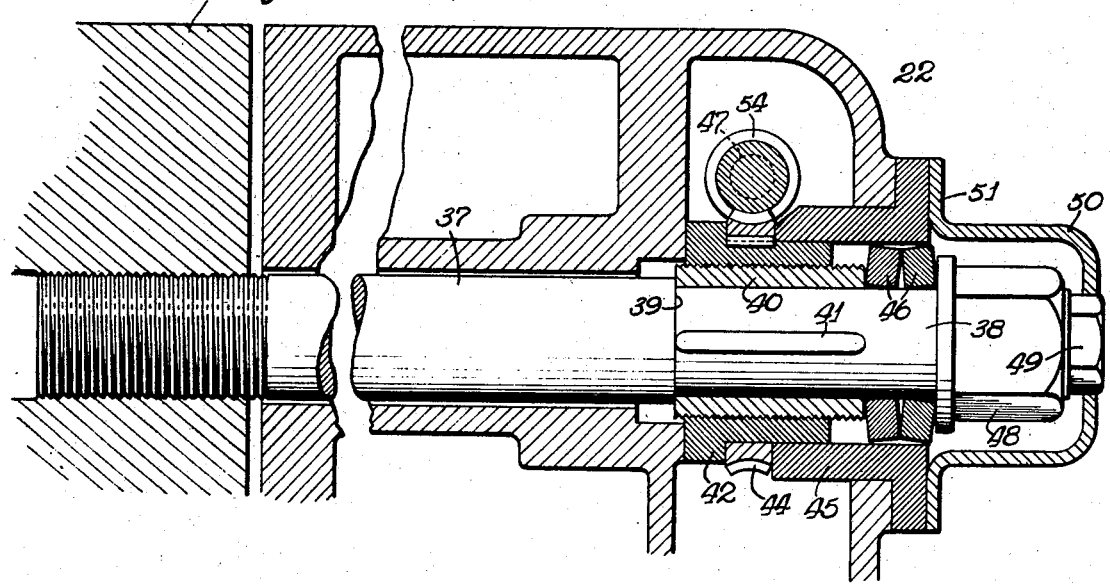

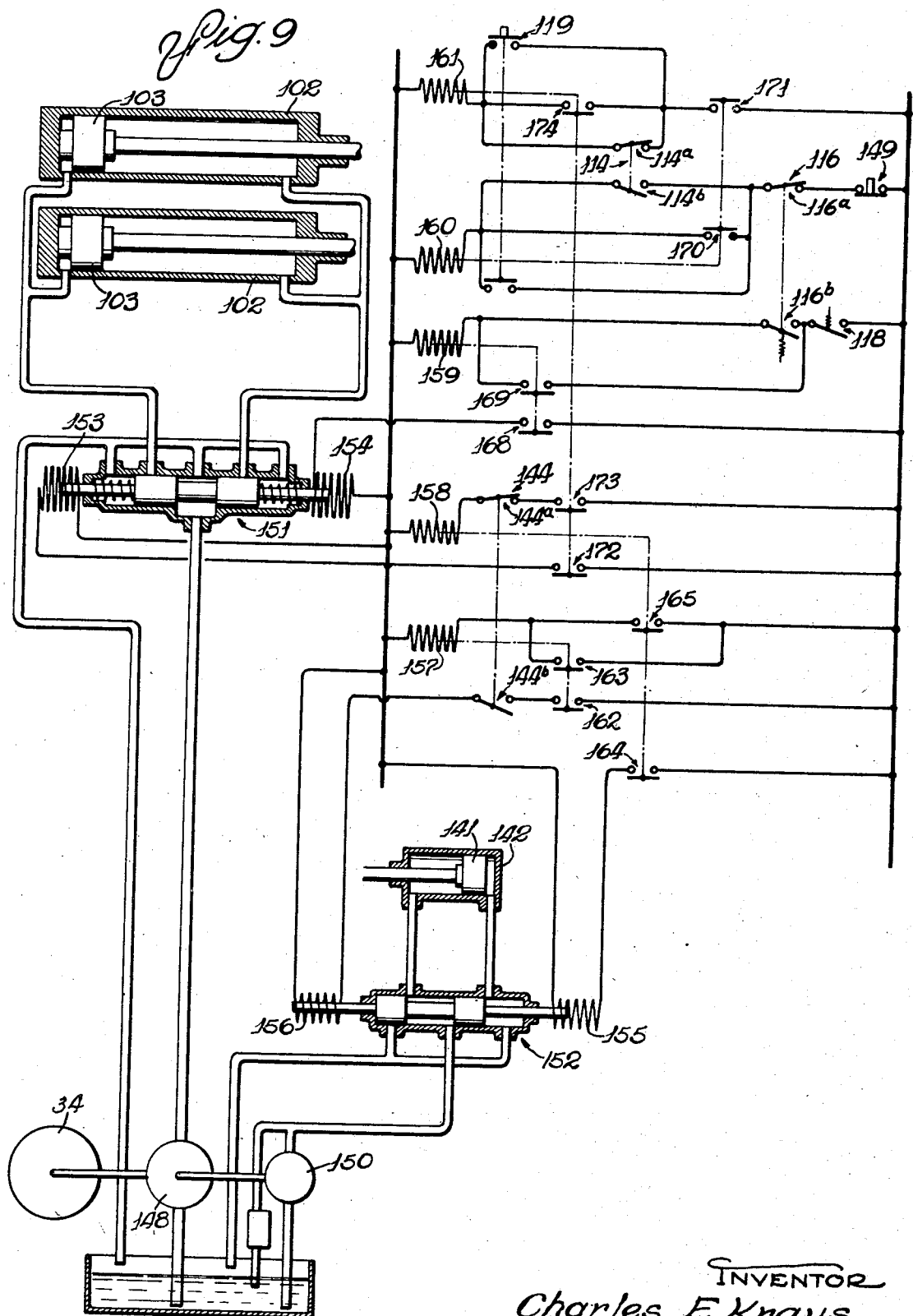

2,225,399

UNITED STATES PATENT OFFICE 2,225,399

METAL REMOVING METHOD AND MACHINE

Charles E. Kraus, Rockford, Ill., assignor to The Ingersoll Milling Machine Company, Rockford, Ill., a corporation of Illinois Application April 1, 1938, Serial No. 199,414

39 Claims. (Cl. 90—28)

The invention relates generally to the removal of metal from the surfaces of plates, slabs, or sheets of varying thicknesses and of substantial length.

The general aim of the invention is to provide a novel machine for scalping one or both flat surfaces of a metal plate at a rate substantially greater than has been possible heretofore.

Another object is to provide a novel method of scalping plates, slabs or the like in which the major portion of the work to be scalped is pushed past, and a short trailing end portion is pulled past, a cutting element, the pushing and pulling operations being so coordinated as to accommodate successive work pieces of different lengths.

Another object is to provide a new and improved machine for simultaneously scalping both surfaces of a metal plate by passing the plate between stationary cutting elements.

A further object is to provide a new and improved machine of the above character embodying rotary feed rolls for pushing the work piece to the cutter and a reciprocating puller for completing movement of the work piece, throughout the remainder of its length, past the cutter after it leaves the feed rolls.

Another object is to provide a novel mechanism for disposing of chips.

Still another object is to protect the machine against the entry of over-size work pieces.

The invention also resides in the novel construction and mounting of the cutter blades and arrangement thereof relative to the back-up roll.

The invention also resides in the provision of means for preventing the entrance of over-thick work pieces into the machine, of means for disposing of chips effectively, of a novel cutter blade mounting, and of a new relationship of the cutter blade, cooperating back-up roll, and chip breaker for unyieldingly holding the work piece against the blade.

Other objects and advantages will become apparent in the following description and from the accompanying drawings, in which Figure 1 is a view in perspective of a machine embodying the features of the present invention.

Fig. 2 is a sectional view through the machine taken on a horizontal plane as indicated substantially by the line 2—2 of Fig. 1.

Fig. 2ᵃ is a fragmentary sectional view taken along the line 2ᵃ—2ᵃ of Fig. 2.

Fig. 3 is a fragmentary vertical sectional view taken substantially along the line 3—3 of Fig. 2.

Fig. 4 is a fragmentary view on an enlarged scale of a portion of Fig. 2.

Fig. 5 is a similar view on a still larger scale showing the construction and arrangement of one of the cutting elements.

Fig. 6 is a fragmentary sectional view through the clamp of the puller mechanism and is taken substantially along the line 6—6 of Fig. 2.

Fig. 7 is a transverse section through the machine illustrating a part of the driving and adjusting mechanism and is taken substantially along the line 7—7 of Fig. 2.

Fig. 8 is a fragmentary view illustrating a detail of the adjusting mechanism and is taken along the line 8—8 of Fig. 7.

Fig. 9 is a diagrammatic view illustrating the arrangement of electrical circuits and hydraulic control.

The invention is illustrated in the drawings and will be described herein as a machine and method for scalping the surfaces of a metal plate or billet W to remove surface irregularities, oxide scale and like foreign matter at some intermediate stage in the process of rolling the plate. Such treatment is desirable in the rolling of soft metals such as copper, brass, aluminum, or alloys of these or similar metals in order to avoid the possibility of foreign matter or imperfections being retained in the metal after the final rolling operations.

While the invention is especially adapted for machine tools for scalping plates which are relatively bendable owing to their comparative thinness, it is susceptible of application to other types of metal-removing processes. It is to be understood, therefore, that I do not intend to limit the invention by the present exemplary disclosure but aim to cover all modifications and alternative constructions, methods, and uses falling within the spirit and scope of the invention as expressed in the appended claims.

Generally stated, the improved method includes pushing the work piece W endwise by gripping it progressively along its length, scalping one or both sides of the piece beginning at the leading end, and completing end to end scalping of the work piece by pulling the trailing end portion of it past the scalping cutters, the pulling operation being preferably initiated as the trailing end approaches the point at which the pushing force is applied.

In carrying out the foregoing method with the machine shown in the drawings, the work piece, standing on one edge, is advanced endwise along an elongated guideway 23 formed by the frame structure of the machine. As shown, this frame includes a base 20 supporting a housing 19 composed of a section 21 fixed on one side of the base and a section 22 mounted on the other side for sliding adjustment toward and away from the fixed section and transversely of the path of the work. The housing encloses and supports cutter assemblies 24 and 25 (Fig. 2) and associated chip disposal means, a rotary pusher comprising power driven feed rolls 26 and 27 by which the leading end portion of the work piece is fed past the cutters, gauge members 28 and 29, a work pulling mechanism 31, and a feeler 30 controlling the latter, together with the adjusting and driving mechanisms for these various elements. The puller mechanism includes a carriage mounted for movement along the line of travel of a work piece as it leaves the housing and supporting clamps 32 (Fig. 2) together with power actuating mechanism 33. Power for actuating the various mechanisms is supplied by an electric motor 34 which together with other mechanism directly actuated thereby may be located conveniently beneath a platform 34ª (Fig. 1) on which the work piece may be supported preparatory to feeding it into the machine.

Referring more particularly to the construction of the housing 19, the section 21 is fixed by suitable means (not shown) to the upper surface of the base 20. The movable section 22 rests upon the surface 35 and is accurately guided in its movement by a key 36 and hold down clamps 36ª. Horizontal adjustment of the housing section 22 is made to accommodate work pieces of different thickness and may be effected in the following manner: Extending through the movable section 22 are four rods 37 (Fig. 3) screw threaded into the fixed section 21. Near their outer ends, each rod has a portion 38 of restricted diameter providing a shoulder 39 against which one end of a collar 40 bears. The collar is splined, as at 41, to the rod and is externally threaded into a nut 42 having a worm wheel 44 keyed thereto and held thereon by a flanged collar 45. Bearing against the outer end of the collar 40 is a heavy spring 46 which is variably tensioned by a nut 48 and permits some degree of spreading of the sections 21 and 22 under excessive strain. The adjusted positions of the collar 40 are maintained by cooperation of the non-circular ends 49 of the rods 37 with caps 50 having flanges 51 provided with arcuate slots 52 (Fig. 1) to receive the bolts 53 by which the flanged collar 45 is secured to the movable section.

To provide for simultaneous rotation of the adjusting nuts 42, the worm wheels 44 mesh with worms 54 (Figs. 3 and 8) on vertical shafts 47. The latter have bevel gear connections 56 with a horizontal rotatable shaft 58 one end of which extends through the front side of the movable section and carries a hand wheel 59 (Figs. 1 and 7).

The work guideway 13 is defined generally by a bottom skid plate 60 (Fig. 3) and by a series of side plates 61 (Fig. 2) mounted on the opposed faces of the fixed and movable housing sections 21 and 22. The work is thus supported on one side edge while being fed through the machine.

To speed up production, provision is made for scalping both sides of each work slab simultaneously and by so-called shaving operations performed by non-rotatable cutters. Accordingly, the cutting elements 24 and 25 are in the form of vertically disposed blades or knives mounted respectively on the fixed and movable housing sections 21 and 22 and spaced along the path of the work piece. The cutting elements are in substantially opposed relation and since they are of like construction, only one need be described. Referring particularly to Figs. 2, 2ª and 4, each cutter includes a blade 63 comprising a bar disposed substantially perpendicular to the path of travel of the work and anchored as by screws 64 against the face of a support 65 with one side portion 63ᵉ of the bar overhanging or projecting laterally beyond the edge 65ª of the support and carrying a cutting edge 63ª. The support 65 is in the form of a carriage from which project T-bolts 66 slidable along horizontal ways 66ª in the housing section. An adjusting screw 67 (Fig. 2) threads into a nut on the blade carriage and has an outer accessible end to which a hand crank may be applied to turn the screw and adjust the blade 63. The latter is locked in adjusted position by tightening the bolts 66.

While being engaged by each cutting edge 63ª, the work piece W is rigidly backed by a vertical roll 68 journaled for idle rotation in the housing section on the side of the work piece opposite the blade.

The blades 63 are constructed and mounted in a novel manner such as to insure a smooth even finish on the work surface. To this end, the overhanging portion 63ᵉ of each blade is made substantially narrower than the body portion 63ᵇ. The leading face 63ᶜ of the blade is of concave contour so that the portion 63ᵉ is of gooseneck shape and presents the cutting edge 63ª to the advancing work. By virtue of this construction, the cutting edge 63ª will, during any bending of the overhanging blade portion 63ᵉ under the stresses to which it is subjected by the advancing work piece, move along or slightly away from the plane of the finished work surface 62 instead of into the work piece. Any possibility of gouging of the work piece, caused by flexing of the blade so that the cutting edge moves toward the work piece, is avoided.

Associated with each blade assembly is means for positively insuring the complete removal of chips or shavings. This means includes a stationary part of each housing section, shown as a guide block 69, spaced ahead of each blade 63 and carrying an elongated deflector plate 70 located immediately in advance of the blade. As shown in Figs. 4 and 5, one edge of the plate bears against the rough surface 62ª of the work piece and is angularly disposed to the latter, being arranged to slope away from the cutter. In the particular construction shown the surface of the plate opposing the cutting face of the blade is of convex contour immediately adjacent the work as indicated at 71ª and then concaved as indicated at 71. The shape of the concavity is such that a chip or shaving from the work piece will be flexed in a direction opposite to the curvature imparted thereto by the action of the blade. When the work piece is of a relatively ductile metal, a continuous shaving 72 (Fig. 4) will be formed by virtue of the straightening action produced by the cutting face 63ᶜ and the guide surface 71. The shaving is thus directed outwardly of the housing through a flaring chip disposal opening defined between the blade carriage on the guide block 69. If the shaving is somewhat brittle, the guide plate surface 71 acts to break it at regular intervals while directing it outwardly as indicated at 73 (Fig. 5).

The back-up roll 68, the chip deflecting member 70, and the blade 63 are positioned relative to each other in a novel manner such that the work piece will be properly presented to the blade and accurately held in proper position during the cutting operation. As shown in Fig. 5, the back-up roll bears against the work piece so that its line 68ᵃ of action or contact is disposed about midway between the points of engagement of the work by the cutting edge 63ᵃ and the chip deflector 70. By virtue of this triangular relationship between the points of engagement by the blade, back-up roll and chip deflector, the work is held firmly against the blade and against flexing or buckling under the forces to which the work piece is subjected.

The feed rolls 26 and 27 are of relatively large diameter in order to grip the work over a substantial area. They are journaled respectively in the housing sections 21, 22 to turn on vertical axes and are spaced and positioned to firmly engage the work immediately in advance of the surfaces provided by the first guide block or deflector supporting member 69 and a guide member 69ᵃ fixed to the housing section 21. To improve the gripping action, the external surfaces of the feed rolls may be lightly knurled or roughened.

The feed rolls 26 and 27 are rotated continuously in the directions indicated by the arrows in Fig. 2 and operate upon the work piece pushed endwise between them to grip the opposite sides of the piece progressively along its length and force all except a short trailing end portion thereof past the blades 63. The peripheral speed of rotation of the rolls is such as to advance the work at a rate substantially higher than that obtainable with ordinary rotary type face milling cutters. For example, a feed rate of twenty-five feet per minute is readily obtainable in the scalping of soft metals such as brass.

Referring to Figs. 1, 3 and 7, power for driving the feed rolls 26 and 27 is derived from the motor 34 and transmitted through a belt 75 to a pulley 76 (Fig. 7) on a stub shaft 77 which is journaled on the fixed housing section 21. A horizontal shaft 78 extends between and is journaled in the fixed and movable housing sections, and this shaft is driven from the shaft 77 by an intermediate gear train comprising the gears 79, 80, 81 and 82. The shaft 78 carries a pair of bevel gears 83, 84 respectively located in the fixed and movable housing sections 22. These gears mesh with corresponding bevel gears 85, 86 respectively fixed to the ends of shafts 87, 88 disposed adjacent to and with their axes paralleling those of the feed rolls, and other gears 89, 90 on said shafts drivingly engage gears 91, 92 (Figs. 2 and 3) on the feed rolls 26 and 27 respectively. The bevel gear 84 is splined, as at 93, to the shaft 78 to permit adjustment of the movable housing section 22 without disturbing the driving relationship between the bevel gears 84 and 86.

Possible breakage of the machine parts or spoilage of work pieces might result from feeding to the rolls 26 and 27 work pieces of substantially greater thickness than that for which the rolls are at any time set to respond. To prevent this, gauge rolls 28, 29 are located respectively on the fixed and movable housing sections 21 and 22 and supported by brackets 94 for rotation on vertical axes. The position of each gauge roll is so correlated with its respective feed roll 26 or 27 that the distance between the longitudinal center line of the passageway 23 and the adjacent periphery of the gauge roll is only a few thousandths of an inch greater than the same distance at the feed roll. The nature of the material being treated will determine the setting of the gauge rolls, and this setting limits the maximum admissible thickness of a work piece. Thus, it will be seen that the gauge rolls block the entry of a work piece which is too thick to be handled properly.

Through the correlation of each gauge roll with the feed roll in the same housing section, relative adjustment therebetween is possible while maintaining the proper gauge roll and feed roll relationship. It will also be noted that relative adjustment of the housing section 22 does not disturb the adjustment of the cutting elements or the relationship of the associated parts thereto. In fact, all of the operating elements, with the exception of the blades 63, may have fixed positions in their respective housing sections and with respect to the fixed path of travel of the work piece defined by the work guideway 23 so that adjustment of the movable housing section 22 for various thicknesses of work pieces automatically adjusts the elements which operate thereon. This is also true of the blades 63 which are, however, independently adjustable to vary the depth of the cut.

By virtue of their rotary character, the feed rolls 26, 27 will grip each work piece progressively throughout its length and feed the major portion of the length of a work piece between and past the cutting elements even though successive work pieces may vary in length. Feeding of the trailing end portion of the work piece past the cutters is effected by the puller mechanism 31 previously referred to, the operation of which is preferably initiated automatically as the extreme trailing end of the work piece approaches the feed rolls.

Referring to Figs. 1, 2 and 3, the puller mechanism includes a carriage in the form of a casting 96 slidable along cylindrical ways 98 which are supported at their inner ends respectively on the fixed and movable housing sections and at their outer ends by standards 99 rising from the floor. The way, which engages the fixed housing section 21, is rigidly and permanently secured thereto, while the way which is connected with the movable section is detachably supported thereon through a plate 100 (Fig. 2) which rides between vertically spaced, horizontal rails 101 (Figs. 1 and 2). This detachable connection allows the way to be loosened from the movable housing section 22 to permit adjustment of the latter.

Reciprocation of the carriage 31 is in this instance effected hydraulically by means of a pair of vertically spaced horizontally extending parallel cylinders 102 and associated pistons 103. Each cylinder is supported by both the fixed and movable housing sections 21, 22, the connection with the fixed section being permanent by screws 104 (Fig. 3), and with the movable section being detachable as by the headed bolt and T-shaped slot connections 105 (Fig. 3). The detachable connection permits of adjustment of the movable housing section. The pistons 103 have rods 106 which extend through packing glands at the rear ends of the cylinder and are connected with upwardly and downwardly projecting arms 107 on the carriage. Reciprocation of the puller carriage is controlled by admitting pressure fluid alternately to opposite ends of the cylinders through ports 108.

The puller mechanism operates in an automatic cycle which includes movement of the carriage 96 away from the starting position shown in Figs. 1, 2, and 3 followed by return to this position, the length of the stroke preferably being greater than the spacing of the feed rolls 26 and 27 and the last knife 63 acting on the work. Initiation of this cycle is controlled by the feeler 30 (Fig. 2) which comprises an elongated arm 108 pivoted at 110 on the movable housing section 22 with its free end 111 projecting across the work guideway 23 between the feed and gauge rolls. Intermediate its ends, the arm is connected to a link 112 which extends through the outer side of the housing section 22 and is connected to the actuating lever 113 of a limit switch 114. A spring 115 urges the switch lever toward a cycle starting position. As a work piece passes through the machine, the feeler end 111 bears against one side surface of the work piece adjacent the entrance to the feed rolls, the switch 114 being positioned to maintain the puller mechanism idle. When the trailing end of the work piece passes beyond the end 111, the spring 115 moves the feeler and actuates the switch to initiate advance of the puller carriage so that the latter pulls the trailing end portion of the work piece past the cutters.

The return movement of the carriage is controlled by a limit switch 116 (Fig. 1) mounted on one of the cylinders for engagement by an adjustable dog 117 on the carriage. Return movement of the carriage is interrupted by a limit switch 118 actuated by a second adjustable dog 118ª. For emergency use, a manually operable switch 119 (Fig. 1) is provided which may be manually actuated to initiate a cycle of the puller mechanism in the same manner as the switch 114.

It is preferred that the puller mechanism 30 exert a substantially greater force on the work piece than the feed rolls so that the trailing end portion of the work piece will without fail be pulled past the cutter blades 63. Furthermore, should the feed rolls for any reason fail to function properly, the puller carriage may, by manual actuation of a switch 119, be utilized to pull the work piece on through the machine.

Preferably, the rate of delivery of pressure fluid to the cylinders 102 during the active stroke of the puller mechanism is such as to advance the carriage 96 at a speed substantially equal to the peripheral speed of the feed rolls 26 and 27, the purpose being to avoid possible disfiguring of the work surfaces by slippage between the work and the gripping elements of the pusher and puller mechanisms. The possibility of such slippage is further reduced by virtue of the constant value character of the pulling force resulting from the use of an hydraulic actuator for the puller mechanism. Moreover, the feeler 30 which controls the puller is positioned close to the feed rolls so that the trailing end of the work piece approaches closely to the point of engagement by the feed rolls by the time the puller becomes effective.

The puller mechanism embodies a novel means indicated at 32 for clamping or gripping the work piece at the beginning of the active stroke of the carriage 96. This means includes a jaw or plate 120 secured to the carriage 96 with its gripping surface disposed in the vertical plane of one finished side of the work piece. The other jaw, indicated at 122, is movable and is normally held in such spaced relation to the fixed jaw that any thickness of work piece, capable of being handled by the machine, may pass between the jaws. Provision is made for shifting the movable jaw out of its normal position into engagement with the work piece and then to release the movable jaw to the action of wedging surfaces which thrust the jaw tightly against the work piece with a force substantially commensurate with, but greater than, the resistance offered to movement by the work piece, the wedging surfaces being arranged immediately to release the movable jaw from its clamped position at the start of the return stroke of the puller carriage.

Referring particularly to Figs. 2, 3 and 6, the movable clamping jaw preferably comprises a series of horizontally extending sections 122ª each arranged to grip the work piece independently. This arrangement is preferred to a single clamping jaw since work pieces of various widths may be handled by the machine without the possibility of the clamping jaw tilting when a narrow work piece is gripped. The sections of the clamping jaw are substantially identical and each comprises a wedge-shaped metal block having a flat finished surface 123 facing the gripping surface of the fixed jaw 120 and an angular surface 124 opposing and complemental to a hardened angular face of a plate 121 secured to the puller carriage and converging toward the fixed jaw in a direction opposite to the feed of the work piece. Each section is supported on the carriage for horizontal, longitudinal sliding movement by headed bolts 125 (Fig. 6) received in T-shaped slots 126. Antifriction means in the form of cylindrical rollers 127 mounted in a retainer plate 128 is interposed between the opposed faces of the hardened plate and the section. The wedging angle of each jaw section is such that the outward or pulling stroke of the carriage 96 will tend strongly to force the movable jaw sections toward the work piece, and yet the jaw section will readily unlock and release immediately upon movement of the carriage in a reverse direction.

The actuating mechanism 33 previously referred to by which the jaw sections 122ª are moved from normal released position into gripping engagement with the work piece comprises the following arrangement of parts: Each section 122ª has a pair of spaced ears 129 extending from the rear side thereof between which is pivoted the bearing end 130 of a pin 131. The outer end of each pin passes slidably through a common actuator bar 132, and means such as a nut 133 on the end of the pin prevents withdrawal of the pin from the bar. Springs 134 act in compression between the bar and the ends 130. The actuating bar is pivotally connected as at 135 to an arm 136 mounted on a rock shaft 137 which also carries a gear segment 138. Rack teeth 139 meshing with the segment 138 are formed on the rod 140 of a piston 141 which is reciprocable in a cylinder 142 on the puller carriage.

When pressure fluid is admitted to the outer end of the cylinder 142, the gear segment is rocked clockwise as viewed in Fig. 2 and the actuating bar 132 and the sections 122ª are moved to the left. A yieldable connection between the bar 132 and the pin 131 is achieved by the interposition of the spring 134. The sections are thus wedged against the work piece to clamp the latter against the jaw 120 with what may be termed a yieldable force.

It will be noted that after the clamping sections have been moved into engagement with a work piece, the travel of the puller carriage in a direction away from the cutter elements 63 will be effective to force the clamping sections tightly against the work piece and that any opposition to movement offered by the work piece will increase the gripping force exerted thereon so that after the clamping sections are finally wedged in position they cannot thereafter slip with respect to the work piece. Moreover, by virtue of the wedging angle employed on the antifriction rollers 127, the initial movement of the carriage in a reverse direction will immediately release the clamp.

Operation of the puller clamps is controlled automatically as an incident to movement of the puller carriage 96, this being effected by a switch device 144 (Fig. 3) arranged for actuation by adjustable dogs 146 and 147 on the carriage. Generally the control of the actuating mechanism is such that when the carriage is in its starting position, the clamping piston 141 is at the outer end of the cylinder 142, the movable clamping jaw 122 being then retracted. When the feeler switch 114 is actuated in the approach of the trailing end of the work piece to the feed rolls, the system is set to admit pressure fluid to the cylinder 142 to drive the piston 141 inwardly, thus causing the clamping jaws to grip the work piece. Since the carriage starts its travel substantially immediately upon actuation of the switch 114 and there is a time lag before the clamping jaws engage the work, the carriage will be moving at full speed before actual clamping of the work piece occurs. The transition of the feeding force from the feed rolls to the puller carriage will be smooth and effective without appreciable change in the speed of movement of the work piece.

Pressure fluid for the puller actuators is derived from a suitable pump 148 (Figs. 1 and 9) driven by the motor 34 and mounted within a housing 149. In this instance, fluid for the clamp actuator is supplied by a separate pump 150 also driven by the motor 34 and disposed within the housing 149. The flow of fluid to and from the various cylinders may be controlled conveniently by solenoid actuated valves 151 and 152. The puller carriage 96 remains idle while the valve 151 is in normal centered position as shown in Fig. 9. In response to energization of a solenoid 153, the valve is shifted to the left to admit fluid to the cylinders 102 for causing an active stroke of the puller carriage. The latter is rapidly returned to starting position when a solenoid 154 is energized. In response to energization of solenoids 155 and 156, fluid is admitted to opposite ends of the cylinder 142 to clamp the puller carriage to and unclamp it from the work. Energization of the solenoids is controlled by relays 157, 158, 159, 160, and 161 respectively operable when energized to close groups of switches 162—163, 164—165, 168—169, 170—171, and 172—173—174. Each of the limit switches 114, 116, and 144 has two connected switches *a* and *b* incorporated therein, one being open when the other is closed and vice versa.

Operation

The machine is conditioned for operation whenever the main drive motor 34 is running. At the end of a cycle, the control parts will be positioned as shown in Fig. 9, all of the solenoids and relays being then deenergized, the puller carriage will be retracted, the puller clamp will be released, and the feeler 30 will project into the work guideway.

To start a new cycle, a work piece W is stood on edge on the platform 34ª and is pushed endwise into the flared end of the guideway 23. If the work piece is not oversize, it will pass the gauge rolls 28 and 29, and, as it passes the end 111 of the feeler 30, will swing the arm 109 in a direction to close the switch 114ᵇ and open the switch 114ª. This completes an energizing circuit for the relay 160 through the switch 114ᵇ and the then-closed switches 116ª and 149. A sealing circuit is established for the relay 160 by closure of its switch 170, and closure of the switch 171 prepares the circuit for the relay 161.

When the leading end of the work piece is pushed in between the feed rolls 26 and 27, the work piece is gripped and advanced progressively along the guideway 23 and past the cutter blades 63 by which opposite sides of the work piece are shaved. Such advance of the work piece by the feed rolls continues throughout the major portion of the piece and until the trailing end of the piece passes the end 111 of the feeler 30 as shown in Fig. 2. When this occurs, the arm 109 moves under the action of the spring 115 in a direction to close the switch 114ª and open the switch 114ᵇ. An energizing circuit is thus completed for the relay 161 through the switches 114ª and 171, a sealing circuit for this relay being established immediately through the switches 174 and 171.

Energization of the relay 161 also closes the switches 172 and 173, closure of the former causing energization of the solenoid 153 which shifts the valve 151 into a position to admit pressure fluid to the cylinders 102 for initiating advance of the puller carriage 96. Closure of the switch 173 energizes the relay 158 through the then closed switch 144ª, and the resulting closure of the switch 164 completes a circuit for energizing the solenoid 155. This causes shifting of the valve 152 to admit pressure fluid to the cylinder 142 so as to actuate the movable clamping jaw 122 of the puller mechanism to the wedged position shown in Fig. 2 thereby clamping the puller carriage 96 to an intermediate scalped portion of the work piece. Energization of the relay 158 also closes the switch 165 completing the energizing circuit for the relay 157 which immediately seals itself by closure of its switch 163, the switch 162 also becoming closed.

By the time that the puller carriage attains its full speed and the power clamps become effective to grip the work piece, the trailing end of the work piece will have approached very closely to the point of gripping engagement between the work piece and the feed rolls. In the continued advance of the puller carriage, the trailing end portion of the work piece is pulled past the two cutter blades 65 thereby completing the scalping of the work piece. At this point, another work piece may be fed into the machine and started through the feed rolls.

After the trailing end of the work has passed the last cutter blade and as the puller carriage approaches the limit of its active stroke, the dog 146 (Fig. 3) on the carriage operates the switch device 144 which results in opening of the switch 144ª thereby deenergizing the clamping solenoid 155 and closure of the switch 144ᵇ which completes the energizing circuit for the unclamping solenoid 156 through the then closed switch 162. The position of the valve 152 is thus reversed causing retraction of the movable clamping jaw 122. In the final advancing movement of the puller carriage, the dog 117 thereon actuates the switch device 116 against the action of its spring to close the switch 116ᵇ and open the switch 116ª. Closure of the former causes energization of the relay 159 through the spring-closed switch 118, and this results in closure of the switches 168 and 169, the latter completing the energizing circuit for the solenoid 154. As a result, the valve 151 is shifted to the right as viewed in Fig. 9, and pressure fluid is admitted to the opposite end of each cylinder 102 initiating rapid return of the puller carriage. In the initial part of this return movement, the positions of the switches 116ᵃ and 116ᵇ are reversed by their springs, energization of the relay 159 being then maintained through the switches 118 and 169.

As the puller carriage in returning reaches its starting position, the dog 118ᵃ operates to open the switch 118 thereby deenergizing the solenoid 154 to permit shifting of the valve 151 to its neutral position under the action of its springs. The final movement of the puller carriage also causes the dog 147 to open the switch 144ᵇ and close the switch 144ᵃ thereby deenergizing the unclamping solenoid 156.

The operating cycle is thus completed and the puller carriage will dwell in its starting position until another work piece has been fed through the machine and its trailing end has approached the feed roll so as to initiate another cycle of the carriage. If, under emergency conditions, a work piece becomes jammed in the machine, the puller may be utilized to advantage in pulling the work piece on through the machine. This is accomplished by manual closure of the switch 119 which is in parallel with the switch 114ᵃ and operates in the manner above described to cause the puller carriage to execute one cycle.

By controlling the cycle of the puller mechanism 31 in response to the approach of the trailing end of the work piece to the feed rolls, it will be seen that a substantially fixed length of the work piece at the trailing end thereof will be drawn past the cutters by the puller. The pusher on the other hand operates to feed variable lengths of the leading end portion of the work pieces to the cutters and is adapted to operate in this manner by virtue of its rotary character.

It will be apparent from the foregoing that the improved method and machine are adapted to scalp both sides of a metal slab simultaneously at substantially higher speeds than is obtainable with the processes heretofore used while at the same time producing a smooth uniform finish. The machine adapts itself automatically to work pieces of different widths and lengths and the machine is safeguarded against the entry of overthick work pieces. In addition, the only adjustments required are for various thicknesses of work pieces and these may be effected quickly and conveniently. The work pushing and pulling mechanisms are adapted to grip the work in a manner such as to avoid marring of the final finish and the shavings removed by the cutters are disposed of in a manner such as to prevent injury to the finished work surface. The capacity of the machine is dependent primarily upon the power available for actuating the feeding mechanisms. Feed rates as high as twenty-five feet per minute are readily obtainable, whereas with the slab milling machines heretofore used for scalping metal plates, a rate of approximately fifteen feet per minute is about the maximum that can be employed.

I claim as my invention:

1. A machine tool having, in combination, a surfacing tool, a rotary power actuated pusher engageable with successive work pieces fed thereto and operable to push variable lengths of successive work pieces past said tool, a reciprocable puller engageable with each work piece at a point beyond said tool, and means automatically controlling the reciprocation of said puller to cause a fixed length at the trailing end of each work piece to be drawn past said tool.

2. A machine tool having, in combination, a surfacing tool, a rotary pusher located at a point in advance of said tool and operable to grip successive work pieces progressively throughout their lengths and feed the leading end portions thereof past the tool, a puller disposed beyond said tool and reciprocable along the path of said work pieces, said puller operable during its active stroke to grip a work piece and pull the trailing end portion thereof past said tool, and means operable automatically in response to the approach of the trailing end of each work piece to said pusher to initiate an active stroke of said puller.

3. A machine tool having, in combination, a surfacing tool, a pusher positioned in advance of said tool and operable to feed the leading end portions of successive work pieces past said tool, a power actuated puller operable to grip each work piece at a point beyond said tool and operable to pull the trailing end portion of the work piece past said tool, a feeler movable into and out of the path of the work pieces at a point in advance of said pusher, and means operated by movement of said feeler into said path in response to movement of the trailing end of a work piece past the feeler to initiate operation of said puller.

4. A machine tool having, in combination, a surfacing tool, a rotary pusher operable to grip successive work pieces progressively along their lengths and advance the leading end portions thereof past said tool, a reciprocable puller operable to grip each work piece at a point spaced beyond said tool, power actuated mechanism adapted when started to execute an automatic cycle during which said puller is first moved away from said tool and then back to starting position, and means controlled by the movement of each work piece to initiate a cycle of operation of said mechanism.

5. A machine tool having, in combination, an element for performing a metal-removing operation on the surface of a work piece, rotary means for gripping said work piece and pushing the leading end portion thereof past said element, a power reciprocated puller mechanism arranged to grip the work piece beyond said element and pull the trailing end portion of the work piece past the element, and means responsive to the movement of said work piece by said pushing means to control the automatic reciprocation of said puller mechanism.

6. A machine tool having, in combination, a surfacing tool, a pusher engageable with successive work pieces at a point in advance of said tool and operable to feed the leading end portions of the work pieces past the tool, a puller disposed beyond said tool and reciprocable along the path of said work pieces, said puller being operable during its active stroke to grip a work piece and pull the trailing end portion thereof past said tool, means operable automatically in response to movement of each work piece to initiate an active stroke of said puller, and manually operable means by which an active stroke of said puller may be initiated.

7. A machine for simultaneously scalping the opposite faces of a metal plate having, in combination, means providing a guideway for said plate during endwise movement thereof, and a pair of stationary blades having cutting edges spaced for engagement with opposite sides of said plate, power driven feed rolls for gripping opposite sides of the plate progressively throughout the length of the latter and feeding the leading end portion thereof past said blades, and a power actuated puller engageable with the plate beyond said blades and operable to draw the trailing end portion of the plate past the blades.

8. A machine for simultaneously scalping the opposite faces of a metal plate having, in combination, means providing an elongated guideway for movement of the plate endwise thereaway, a pair of stationary blades spaced along the path of the plate and disposed on opposite sides thereof with cutting edges lying in the planes of the finished surfaces to be formed on the plate, and power actuated mechanism operable to feed the plate along said guideway to present the entire side surfaces of the plate to the edges.

9. A machine for simultaneously scalping the opposite faces of a metal plate having, in combination, means providing an elongated guideway for movement of the plate endwise therealong, a pair of stationary blades spaced along the path of the plate and disposed on opposite sides thereof with cutting edges lying in the planes of the finished surfaces to be formed on the plate, power actuated mechanism operable to feed the plate along said guideway to present the entire side surfaces of the plate to the edges, and back-up rolls engageable with the sides of said plate opposite the respective blades.

10. A machine for simultaneously scalping the opposite faces of a metal plate having, in combination, means providing a guideway for endwise movement of the plate therealong, a pair of stationary cutting edges engageable with opposite sides of said plate throughout the width of the latter, and power actuated mechanism operable to feed the plate along said guideway, to present the entire side surface areas for removal of metal from such entire areas by said cutting edges.

11. A machine for simultaneously scalping opposite side faces of a metal plate having, in combination, means for supporting and feeding the plate in an endwise direction, a pair of cutters spaced along the path of movement of the plate and operable in the advance of the plate to scalp opposite sides thereof, rigidly supported guide members each bearing against said plate on the side thereof opposite one of said cutters and rigidly backing up the latter, and power operated mechanism for pushing the leading end portion of said plate past said cutters successively and pulling the trailing end portion of the plate past the cutters.

12. In a machine for scalping opposite faces of a work piece, the combination of opposed cutter elements, a pair of cooperating feed rolls for moving a work piece between said elements, a pair of cooperating gauge members disposed in advance of said feed rolls and set to pass therebetween a work piece having a thickness dimension only slightly greater than the spacing between the feed rolls, each feed roll and the corresponding gauge member having relatively fixed positions, and means supporting one feed roll and the corresponding gauge member for bodily adjustment toward and away from the complemental rolls whereby to adjust the machine for handling work pieces of different thicknesses.

13. In a machine for scalping opposite faces of a work piece, the combination of opposed cutter elements, feed rolls for moving a work piece between said elements, and gauge rolls disposed in advance of said feed rolls and set to pass therebetween a work piece having a thickness dimension only slightly greater than the spacing between the feed rolls.

14. In a scalping machine, the combination of cutting means, feed rolls for moving a work piece toward said cutting means, and gauge means in advance of said feed rolls for preventing entry to the feed rolls of a work piece having greater than a predetermined thickness.

15. A machine for scalping a work piece having, in combination, a surfacing tool, a pair of cooperating feed rolls arranged to grip opposite sides of a work piece progressively throughout its length to feed the work piece past said tool, and means disposed in advance of said feed rolls and operable to block the entry of a work piece of a thickness greater than that for which said feed rolls are set to operate upon.

16. A machine tool having, in combination, means defining an elongated guideway for endwise movement of successive work pieces therealong, a surfacing tool operable upon the surfaces of the work pieces advanced along said guideway, a continuously rotating pusher mechanism disposed in advance of said tool and engageable with the successive work pieces to feed the leading end portions thereof past said tool, and a puller reciprocable along said guideway beyond said tool and operable during its active stroke to grip each work piece and pull the trailing end portion thereof past said tool.

17. A machine tool having, in combination, a surfacing tool, a rotary mechanically driven pusher operable to grip successive work pieces progressively along their lengths and feed the leading end portions thereof past said tool, and a fluid pressure reciprocated puller engageable with each work piece beyond said tool and operable during its active stroke to grip a work piece and pull the trailing end portion thereof past the tool.

18. A machine tool having, in combination, a surfacing tool, a rotary pusher spaced in advance of said tool and engageable with successive work pieces progressively along the lengths of the latter to push the leading end portions past said tool, and a reciprocatory puller operable to grip each work piece beyond said tool and to pull the trailing end portion thereof past the tool, said puller having an active stroke of a length greater than the spacing of said pusher from said tool.

19. A machine tool having, in combination, an element for performing a metal-removing operation on the surface of a work piece, rotary feed rolls for gripping opposite sides of said work piece and operable to push the leading end portion of the work piece past said element, and a power actuated reciprocable puller mechanism arranged to grip the work piece beyond said element and to pull the trailing end portion of the work piece past the element.

20. A machine tool having, in combination, an element for performing a metal-removing operation on the surface of a work piece, power rotated means for gripping said work piece progressively throughout its length and operable to push the leading end portion of the work piece past said element, a power actuated mechanism to grip the work piece beyond said element and to pull the trailing end portion of the work piece past the element, and guide means for engaging the work piece as it leaves said pushing means and prior to its being gripped by said pulling means to prevent its lateral displacement by said surfacing element.

21. A machine for scalping opposite sides of metal plates of different thicknesses having, in combination, means defining an elongated guideway for endwise movement of a plate therealong, a pair of rotary feed rolls adapted for gripping engagement with opposite sides of a plate, a pair of cutters spaced beyond said feed rolls and adapted to scalp opposite sides of the plate fed therebetween, means stationarily supporting one of said rolls and one of said cutters, means supporting the other roll and the other cutter for bodily adjusting movement toward and away from the fixed roll and cutter whereby to adapt the cutters for operation on plates of different thicknesses, a jaw having a laterally fixed gripping face disposed substantially in alinement with the cutting plane of one of said cutters and engageable with one side of a plate at a point beyond said cutters, a cooperating jaw movable laterally of the plate into and out of engagement with the opposite side thereof to clamp the plate against said fixed jaw, and power actuated means for moving said jaws longitudinally of said guideway to pull the trailing end portion of a plate past said cutters.

22. A machine for scalping opposite sides of metal plates having, in combination, means defining an elongated guideway for endwise movement of a plate therealong, a pair of rotary feed rolls adapted for gripping engagement with opposite sides of a plate, a pair of cutters disposed beyond said feed rolls and engageable with spaced portions of the plate on opposite sides thereof to scalp such sides, back-up rolls each engageable with the side of the plate opposite one of said cutters, stationary means supporting one of said feed rolls, one of said cutters, and the back-up roll of the other cutter, and means supporting the other feed roll, the other cutter and the back-up roll for bodily adjustment toward and away from the opposed feed roll, back-up roll, and cutter whereby to adapt the machine for scalping plates of different thicknesses.

23. A machine for scalping metal plates having, in combination, a guideway adapted for the advance of a plate endwise therealong, a surfacing tool operable upon one side of the plate during advance thereof, means for feeding a plate to said cutter, a puller carriage disposed beyond said tool and reciprocable longitudinally of said guideway, a laterally fixed jaw on said carriage adapted for gripping engagement with one side of the surfaced plate, a wedge surface supported by said carriage on the opposite side of said plate and converging toward the plate in the direction of said tool, a jaw on said carriage movable longitudinally of said guideway and cooperating with said surface to wedge the plate against said first mentioned jaw, and power actuated means on said carriage for actuating said movable jaw.

24. A machine for scalping a metal plate having, in combination, means defining a guideway for movement of the plate endwise therealong, a cutter operable on said plate to surface one side thereof, means for feeding the plate to the cutter, a normally fixed jaw positioned to grip one side of the plate beyond said cutter, a cooperating jaw movable toward and away from the fixed jaw to grip the opposite side of the plate, and power actuated mechanism for moving said jaws longitudinally of said guideway to pull the trailing end portion of said plate past said cutter, the face of said fixed jaw bearing a fixed relation to the cutting plane of said cutter whereby to avoid bending of the plate as an incident to clamping thereof by said jaws.

25. In a machine of the character described, the combination of a cutter and means for pulling a work piece past said cutter including a pair of opposed clamping jaws supported for reciprocatory movement along the line of travel of the work piece, one of said jaws being alined with the cutting plane of the cutter and the other jaw being movable toward and away from the first jaw, wedge means cooperative with the movable jaw to effect such movement upon displacement of said movable jaw in the direction of said reciprocatory movement, the relationship being such that the movable jaw approaches the first jaw upon displacement thereof in a direction opposite to the travel of said work piece, and means for actuating said movable jaw.

26. A machine of the character described having, in combination, a cutter operable to scalp one side of a work piece during endwise movement thereof past the cutter, a power actuated puller carriage reciprocable longitudinally of the work piece beyond said tool, relatively movable jaws on said carriage for gripping opposite sides of the work piece, a wedge surface on said carriage operable on one of said jaws during movement of the carriage away from said tool to increase the gripping forces exerted by said jaws on the work piece, and power actuated means for yieldably actuating said movable jaw to cause initial engagement of the work piece thereby.

27. A machine of the character described having, in combination, a cutter operable to scalp one side of a work piece during endwise movement thereof past the cutter, a power actuated puller carriage reciprocable longitudinally of the work piece beyond said tool, relatively movable jaws on said carriage for gripping opposite sides of the work piece, power actuated means on said carriage for actuating at least one of said jaws, and a wedge surface on said carriage operable on one of said jaws during movement of the carriage away from said tool to increase the gripping forces exerted by said jaws on the work piece and to release the gripping force upon reverse movement of the carriage.

28. A machine of the character described having, in combination, a cutter operable to scalp one side of a work piece during endwise movement thereof past the cutter, a power actuated puller carriage reciprocable longitudinally of the work piece beyond said tool, relatively movable jaws on said carriage for gripping opposite sides of the work piece, power actuated means on said carriage for actuating at least one of said jaws, a wedge surface on said carriage operable during movement of the carriage away from said tool to increase the gripping forces exerted by said jaws on the work piece, and antifriction elements disposed between said wedge surface and said movable jaw.

29. In a machine of the character described, means for exerting a pulling force upon a work piece comprising a carriage mounted for reciprocation along the line of travel of the work piece, a fixed clamping jaw mounted on said carriage, a series of cooperating clamping jaw sections movably mounted on said carriage in opposition to said fixed jaw, means operable on said sections during advance of said carriage while the work piece is clamped by said jaws to tighten the clamping forces exerted on the work piece, and means for forcing said sections initially into engagement with the work piece to permit said sections thereafter to be forced individually against the work piece by movement of the carriage.

30. In a scalping machine, the combination of a stationary blade, means for feeding a plate past said blade, and means for holding said plate in operative engagement with said blade including a back-up member engaging the opposite side of said plate slightly in advance of said blade, and a guide member engaging the side of the plate operated on by said blade and located slightly in advance of said back-up member, the effective points of engagement of said blade, said back-up member, and said guide member with said plate defining a triangle whereby to hold the plate against flexing adjacent the point of operation of the blade thereon.

31. In a scalping machine, the combination of a stationary blade, means for feeding a plate past said blade, a back-up roll opposed to said blade and disposed slightly in advance thereof, and a fixed plate engaging element on the same side of the plate as the blade and spaced therefrom, the line of action of said back-up roll being disposed approximately midway between the points of engagement of the plate by said blade and element.

32. In a machine for scalping a flexible work plate, the combination of a stationary cutter blade, mechanism for feeding the work plate past said blade to cause scalping of one side surface thereby, a guide member bearing against said side surface at a point spaced from the point of engagement by said blade, and a back-up member bearing against the opposite side of said plate.

33. In a scalping machine, the combination of a stationary blade for scalping the surface of a metal plate, means for feeding said plate past said blade, and means for directing a removed shaving to a disposal point including a member projecting toward and disposed closely adjacent the plate a short distance in advance of the blade edge, said member having a side surface positioned for engagement by the arcuate shavings produced by the blade edge and having a contour tending to reverse the curvature of said shavings.

34. In a scalping machine, the combination of a stationary blade for scalping the surface of a metal plate, means for feeding said plate past said blade, and means for controlling the flow of shavings removed by the blade edge including a member disposed adjacent but in advance of said blade and having an angularly disposed surface sloping away from said blade and located for engagement by a shaving curling outwardly and reversely from the cutting face of said blade.

35. A blade scalping machine having in combination, means for supporting and advancing a work plate endwise, a rigid support disposed adjacent the path of travel of said plate and facing in a direction opposite to the plate movement, a blade for shaving a layer of metal from one side of the plate during advance thereof comprising a bar disposed substantially perpendicular to said path and anchored against said support with one edge portion overhanging the support, and a cutting edge on the free end of said overhanging portion engageable with said plate, said overhanging portion being shaped to locate said cutting edge at least adjacent the center line of said bar whereby said cutting edge, during any bending of the overhanging portion under the stresses exerted thereon by the work, will not move deeper into said plate.

36. A blade scalping machine having, in combination, means for supporting and advancing a work plate endwise, a rigid support disposed adjacent the path of travel of said plate, a blade for shaving a layer of metal from one side of the plate during advance thereof comprising a bar anchored on said support with one edge portion overhanging the support and having a cutting edge engageable with said plate, the cutting face of said overhanging portion being of concave contour whereby to locate said cutting edge in the direction of advance of the work plate beyond the fulcrum about which said overhanging portion may bend under the stresses applied thereto by the advancing plate.

37. The method of scalping elongated plates of variable lengths which comprises gripping each plate progressively along its length to push the leading end portion of the plate past a surfacing tool, gripping the leading end portion of a plate when the trailing end thereof reaches a predetermined point, and pulling the trailing end portion of the plate past said tool.

38. The method of scalping plates of varying lengths which comprises gripping the successive plates progressively throughout their lengths to push variable lengths of the leading end portions of the plates past a surfacing tool, and gripping a surfaced portion of each plate to pull a fixed length of the plate past said tool.

39. The method of scalping elongated plates of variable lengths which comprises gripping each plate progressively along its length to push the leading end portion of the plate past a surfacing tool, guiding the plate against lateral flexure as it passes the tool, and pulling the trailing end portion of the plate past said tool.

CHARLES E. KRAUS.